United States Patent
Antonelli et al.

(10) Patent No.: US 8,599,649 B1
(45) Date of Patent: Dec. 3, 2013

(54) LASER-BASED METHOD OF DETECTING UNDERWATER SOUND THROUGH AN ICE LAYER

(75) Inventors: Lynn T. Antonelli, Cranston, RI (US); Fletcher A. Blackmon, Forestdale, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 393 days.

(21) Appl. No.: 13/041,661

(22) Filed: Mar. 7, 2011

Related U.S. Application Data

(60) Provisional application No. 61/311,801, filed on Mar. 9, 2010.

(51) Int. Cl.
*G01H 9/00* (2006.01)

(52) U.S. Cl.
USPC ......................................................... 367/149

(58) Field of Classification Search
USPC ......................................................... 367/149
See application file for complete search history.

(56) References Cited

U.S. PATENT DOCUMENTS

| | | | |
|---|---|---|---|
| 5,838,439 A | 11/1998 | Zang | |
| 5,883,715 A | 3/1999 | Steinlechner | |
| 6,320,665 B1 | 11/2001 | Ngoi | |
| 7,113,447 B1 | 9/2006 | Matthews | |
| 7,173,880 B2 | 2/2007 | Bernard | |
| 7,251,196 B1 | 7/2007 | Antonelli | |
| 7,283,426 B2 | 10/2007 | Grasso | |
| 7,613,075 B2 | 11/2009 | Cray | |
| 2004/0252587 A1 | 12/2004 | Melese | |
| 2009/0201763 A1 | 8/2009 | Jones | |

OTHER PUBLICATIONS

Antonelli J. Acoust. Soc. Am. vol. 125, Issue 4, pp. 2556-2556 (2009) herein "Antonelli2009".*

* cited by examiner

*Primary Examiner* — Isam Alsomiri
*Assistant Examiner* — Hovhannes Baghdasaryan
(74) *Attorney, Agent, or Firm* — James M. Kasischke; Michael P. Stanley

(57) ABSTRACT

A sensor system is provided comprising a Laser Doppler Vibrometer (LDV) that senses underwater sound via vibrations on an ice surface. In operation, a beam of the LDV measures a surface velocity and therefore an associated pressure signal from the ice surface due to an impinging underwater sound. The beam reflected from the surface carries the acoustic information back to the LDV. Using interferometry to derive the acoustic signal carried on the reflected beam; the LDV provides acoustic signal data in the form of a voltage signal. A computer processes the voltage signal as data that estimates a sound pressure level of the underwater source.

2 Claims, 1 Drawing Sheet

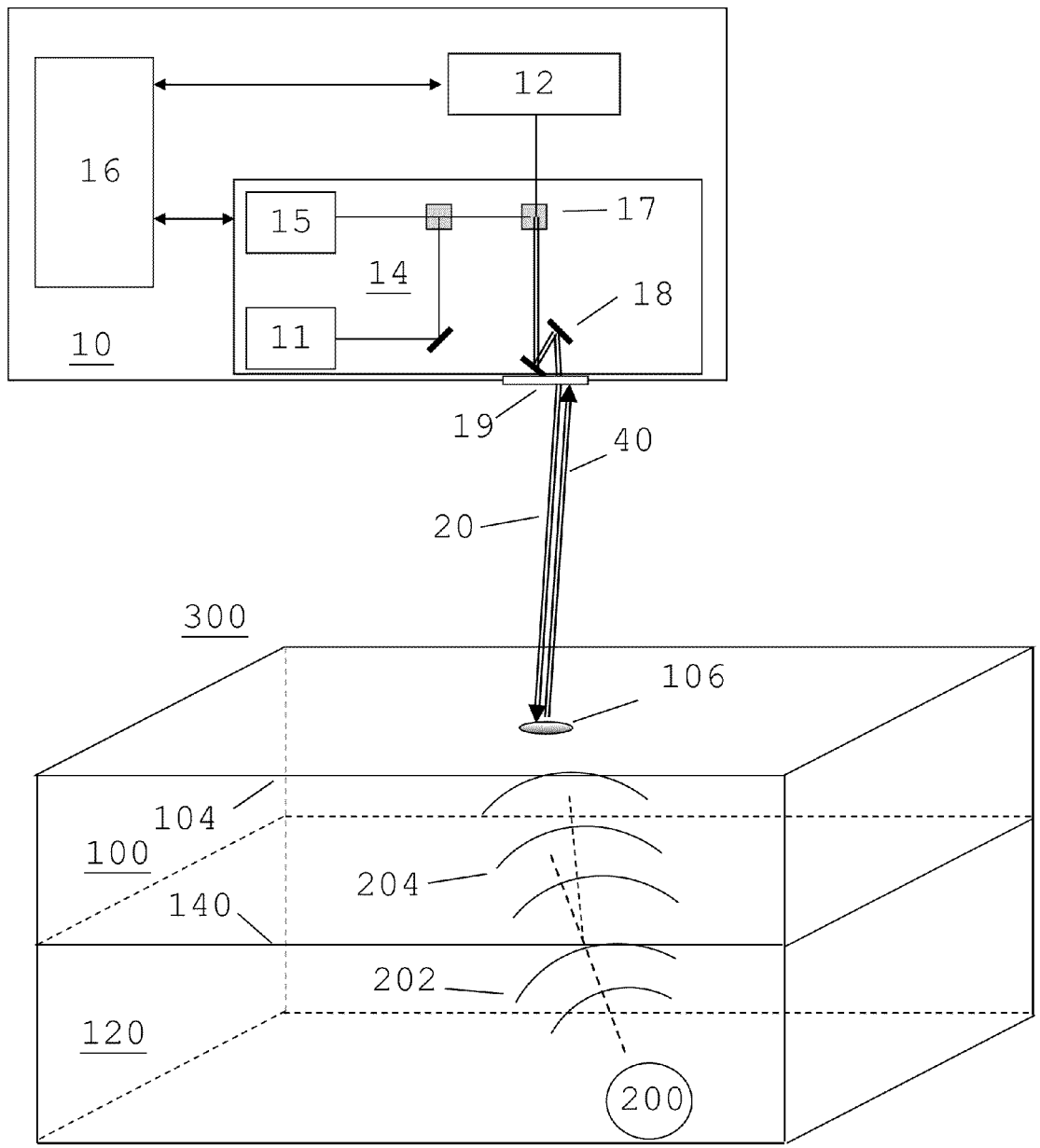

LASER-BASED METHOD OF DETECTING UNDERWATER SOUND THROUGH AN ICE LAYER

This application claims the benefit of U.S. Provisional Patent Application Ser. No. 61/311,801 filed on Mar. 9, 2010 for the inventors, Lynn Antonelli and Fletcher Blackmon.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to the field of underwater acoustic sound detection through an ice layer. Specifically, a system and method of use is provided for the sound detection wherein the sound detection is accomplished by impinging on an ice object that is partially submerged. A Laser Doppler Vibrometer sensor measures surface velocity and therefore an acoustic pressure signal present at the ice surface being probed. Likewise, sensing of the underwater sound can be obtained by measuring the ice surface displacement using the sensor.

(2) Description of the Prior Art

The present invention provides a system that utilizes a Laser Doppler Vibrometer (LDV). The LDV is a commercial product that is based various interferometric system designs [See U.S. Pat. No. 5,838,439 and U.S. Pat. No. 5,883,715].

In operation, the LDV focuses a single output laser beam onto a measurement surface. The LDV then detects a laser beam reflected from the surface. By interfering the detected beam that was reflected by the measurement surface with a reference beam within the LDV; a measure of the surface velocity (and displacement) is obtained.

The technique of utilizing a LDV has been applied to measure water surface vibrations in order to remotely detect underwater sound since the water surface will vibrate when influenced by an acoustic pressure field. The underwater signals that are sensed can be used for active or passive sonar, surveillance purposes, or underwater acoustic communications from a number of submerged objects. Perpendicular incidence of the focused laser beam on the dynamic water surface waves is critical for obtaining a reflected signal.

Similarly, the laser beam must be reflected back from the ice surface for sensing to occur. However, measurement of ice surfaces is demonstratively different. The ice does not undergo dynamic wave motion and its surface reflectively is not consistent. The ice surface may not be smooth and may be covered with snow, each factor affecting the reflective properties. Back-reflection of the focused laser beam from the ice surface will occur when the laser beam is perpendicularly incident upon a smooth, specularly reflecting section of the ice surface.

Laser probing of ice surfaces provides intermittent laser returns thus causing optical and acoustic signal dropout at various points. Retro-reflective aids to sensing can be employed to mitigate signal dropout due to an ice surface reflectivity condition.

U.S. Pat. No. 6,320,665 (Ngoi et al.) discloses the use of a scanning laser interferometer to measure the motion of an object. The design of an interferometer is presented using an acousto-optic deflector to achieve scanning of the laser beam onto the target. The interferometer is then presented for measuring the relative height between two disk surfaces of a computer hard drive while the drive is spinning.

In the Ngoi reference, acousto-optic does not refer to the optical measurement of an acoustic signal and does not refer to detecting acoustic signals on an ice layer. Furthermore, the interferometer of the Ngoi design directs a reference laser beam onto a secondary surface in order to obtain a relative measurement of the disk drive surface motion. This differential interferometer was designed to measure the difference in heights between disk surfaces and not to detect absolute vibration velocity. Therefore, the design would not detect underwater sound from ice surfaces vibrations.

U.S. Pat. No. 7,113,447 (Matthews et al.) describes the use of a laser velocimeter to sense underwater acoustic signals by optically interrogating the outer surface of a hollow sphere mechanism (surrounded by a resilient matrix material, i.e., gel) that is in contact with the water environment. The sphere moves due to incident acoustic pressure waves. The motion of the sphere is measured using a laser velocimeter.

This technique necessitates using a sphere/matrix combination along with the laser velocimeter to detect underwater sound in water and would not be applicable for ice surfaces. The terminology for a laser velocimeter typically refers to a device used for measuring a flow velocity of a fluid.

U.S. Pat. No. 7,173,880 (Bernard) discloses a means of evaluating the velocity of sound wave propagation in the water so that an accurate determination of the depth of a pinging mechanism deployed by a surface vessel can be made. This is not a sensor to detect underwater sound signals and as such would not be applicable to detecting sound through an ice layer.

U.S. Pat. No. 7,251,196 (Antonelli) outlines a method and apparatus for detecting underwater sound via the vibrations caused by an impinging acoustic pressure wave on the water surface using a laser vibrometer in combination with a glint tracker device. The Antonelli reference contains an apparatus specific to detection on a dynamic water surface. The glint tracker's laser steering mechanism continually directs the sensing laser beam on the water surface where the surface slope provides a back-reflection to the remotely—located sensor apparatus. The ice surface does not move with the same dynamics as water surface waves. Detecting underwater sound through an ice layer would not involve tracking of water surface waves, but rather depends on the ice surface reflectivity.

Additionally, coupling of the acoustic energy from the water to the ice occurs. A portion of the sound wave energy is transmitted through the water-ice boundary as a function of the acoustic impedance difference between water and ice. This sound wave then propagates through the ice layer where it would be detected by the laser vibrometer sensor at the ice-air boundary. The propagation angle of the acoustic wave is increased (relative to the surface normal) at the water-ice boundary due to the increased sound speed in the ice relative to the water.

U.S. Pat. No. 7,283,426 (Grasso) outlines the use of a pulsed underwater laser system to detect submarine wakes. The laser beam pulses emitted into the sea reflect from moving particles in the water. By correlating the speckle pattern received by successive pulse an estimate of the degree of particle motion is obtained. A ship wake is suspected if the correlation indicates larger particle motion. In the cited reference there is no means of detecting the underwater sound, particularly on an ice layer. The Grasso reference outlines a non-acoustic sensor for measuring in-water particle motion from which ship wakes would be determined. Such a system would require a laser to propogate within a water column to detect the motion of in-water particles and thus would not be applicable to in-air detection of acoustic vibrations on ice surfaces.

U.S. Pat. No. 7,613,075 (Cray) and U.S. Pat. No. 7,259,864 (Antonelli, et al.) outline means of using a laser vibrometer to sense the inside hull surface of an underwater vehicle (such as a torpedo or a ship sonar dome). The laser vibrometer probes the inside surface of the underwater vehicle to measure vibrations that occur due to impinging acoustic pressure waves to detect the in-water sound. This technique could not be used to measure the underwater sound through an ice layer from a remote location because it is designed for short propogation distance to the inner hull surfaces of an underwater vehicle that can be properly coated for high optical reflectivity. The acoustic energy interaction with the hull surface is a critical piece to reference but would not apply to the optical sensing of ice surface vibrations.

United States Patent Application Serial No. 2004/0252587 (Melese) discloses a method of imaging surface vibrations using reflected light captured by a photodetector array. The method relies on amplitude fluctuations of the light on each element of the photodetector array and performs analysis (Fourier transform) on each photodetector array element signal output. The cited reference relies on a light source that illuminates the entire object to be imaged. The method does not rely on any interferometry and therefore does not measure phase changes in the light. Thus, the method lacks fine scale resolution of the surface vibration velocity that vibrometers offer. The method also does not have the sensitivity for detecting softer acoustic sounds that may propagate to an ice surface. The technique basically detects a vibration velocity on the order of 100 micrometers per second rather than sensitivity on the order of 0.01 micrometers per second, which is the current state of the art for laser vibrometers.

United States Patent Application Serial No. 2009/0201763 (Jones) outlines a system for detecting underwater objects (such as mines) using an in-air laser to generate in-water sound and a sonobuoy field to detect the sound reflected from underwater objects. The sonobuoys would then wirelessly communicate with a host system to process the acoustic signals detected by the sonobuoys. This system is not capable of being used to detect underwater sound on an ice surface.

The foremost issue governing LDV performance capabilities on uneven reflective surfaces is the signal dropout due to laser reflections not being captured by the sensor system. The accuracy and reliability of an in-air probe is dependent upon receiving laser reflections from the surface. The laser transmitter and receiver are typically co-located in interferometric-based vibrometer systems, and thus require a retro-reflection of the laser beam from the surface. Since uneven ice surfaces, and snow covered conditions prevail in realistic situations, significant intermittence of a received signal may be expected as these surface conditions disallow laser retro-reflection.

SUMMARY OF THE INVENTION

The purpose of the invention is to detect underwater acoustic sound impinging on an ice object that is partially submerged in water by using a laser Doppler vibrometer sensor to measure the surface velocity and therefore an acoustic pressure signal at the ice surface being probed. As noted, a surface with a poor reflective quality due to angled or snow-covered ice surfaces and motion of the ice will degrade sensor performance by increasing the signal dropout rate. A solution is to monitor the ice surface using an illuminating source and record the reflected light using a camera to identify the trajectory to areas of direct reflection back to the laser source and to actively steer the sensing laser along that trajectory onto a glint retro-reflection surface using a glint tracking device. The result is that the laser is steered onto a position where the LDV will receive a direct reflection from the ice surface.

BRIEF DESCRIPTION OF THE DRAWINGS

Other objects, features and advantages of the present invention will become apparent upon reference to the following description of the preferred embodiments and to the drawing, wherein corresponding reference characters indicate corresponding parts throughout the drawing and wherein FIG. 1 depicts the operation of the system of the present invention.

DETAILED DESCRIPTION OF THE INVENTION

The optical sensor system 10 of the present invention comprises a LDV acoustic-optic sensor 12 that senses underwater sound propagating through an ice layer 100 as the underwater sound creates motion of an ice surface 104. The optical sensor system 10 could be carried or positioned on a remote location such as a sea vessel or an aircraft.

When activated, the system 10 provides a remote aerial sensing capability for measuring ice surface vibrations in response to any number of underwater sound sources 200 such as marine mammals, passive or active sonar for ASW use, etc., and underwater acoustic communications from a number of submerged platforms such as submarines and unmanned undersea vehicles (UUVs).

The optical sensor system 10 includes an optical glint tracker 14 and a computer controller 16 operationally connected to the LDV 12. However, as explained further, use of the optical glint tracker system 14 is not required. The computer controller 16 accommodates data acquisition and processing of data from the LDV 12; controls the operation of the glint tracker system 14; and accepts steering trajectory data from the glint tracker system.

As noted, the LDV sensor 12 is operable in the vicinity of the partially submerged ice layer 100, where a portion of the ice is exposed to the air while the remaining ice is underwater. The LDV 12 and the glint tracker 14 emanate separate optical beams, which are co-aligned using an optical beam splitter 17 within the glint tracker. The co-aligned optical beams are output from the sensor system 10 as an optical beam 20 through an optical window 19. The light output from an illuminating laser 11 of the glint tracker 14 is used to illuminate a spot on the ice surface. Reflections from the ice surface, if available, are captured by a digital camera 15 that is contained within the glint tracker 14.

The pixel locations (a tracked image) of the captured glint reflections are used to determine the trajectory to retro-reflection points on an ice surface 104. The glint tracker 14 then adjusts steering mirrors 18 along the appropriate trajectory to maintain glint reflection capture by the camera 15.

The glint tracker optical beam and the LDV sensing optical beam are co-aligned as the beam 20 so that their trajectories are matched while tracking a retro-reflecting surface glint in order to enable sensing on the ice surface 104. The LDV sensing beam contained within a co-aligned reflected beam 40 measures a surface velocity of the ice surface 104 and therefore an associated pressure signal 204 from the ice layer 100 due to an impinging underwater sound 202. If no reflections are initially observed by the glint tracker 14, the controller 16 commands the glint tracker to adjust the steering mirrors 18 until reflections from the ice surface 104 are detected.

Specifically, the underwater sound 202 naturally propogates upward from the underwater sound source 200 thru an underwater environment 120 and onto a water-ice surface boundary 140. The underwater sound 202 is partially transmitted into the ice layer 100 and shifted in direction slightly due to the increase in sound speed in the ice relative to that in the water.

The pressure signal 204 propagates upward thru the ice layer 100 and eventually is measurable on the ice-air (surface) boundary layer 104 as a surface motion. Optical sensing of the ice surface motion is achieved by measuring the Doppler frequency shift of the LDV optical beam 40 reflected from the ice surface 104 back into the LDV 12.

Improvement of the optical reflectivity of the ice surface 104 may be achieved using a retro-reflective deposit 106. The retro-reflective deposit 106 may be small glass-based or aluminum coated spherical particles, strips or any other item that can be positioned on the ice surface 104. The retro-reflective deposit 106 is exposed to an adjacent air environment 300 and vibrates along with the ice surface 104 with which the retro-reflective deposit is in direct physical contact.

When operating the system 10, the co-aligned beam 20 would emanate from the LDV 12 and the glint tracker 14 to find and impact the retro-reflective deposit 106. A reflection of the co-aligned beam 20 from the retro-reflective deposit 106 would translate as a reflected beam 40. The reflected beam 40 carries the acoustic vibration information back to the LDV 12.

Using Doppler interferometry to derive the acoustic signal from the Doppler frequency shift information carried on the reflected optical beam 40; the LDV 12 provides acoustic signal data in the form of a voltage signal at an output of the LDV. The computer controller 16 processes voltage signal as data that validates detection of the underwater sound; attempts to classify the sound source type; and to estimate a location of the underwater sound source 200.

The ice surface 104 can be continually monitored by using an illuminating source and recording the reflected light using a camera to identify areas of direct reflection back to the laser source and to actively steer the sensing laser onto the retro-reflection deposit 106. The combined use of the retro-reflector deposit 106 with the glint tracker system 14 would mitigate signal dropout due to natural ice surface reflectivity conditions and improve the overall reliability of the LDV sensor performance for measuring on ice surfaces. The result is that the laser is continuously steered onto a position where the LDV will receive a direct reflection from the ice surface.

The use of an image-based glint tracking system, or retro-reflective sensing aids enhance the performance and flexibility of the present invention. The operation of the LDV with and without retro-reflective sensing aids can function in regard to reflective ice surfaces to obtain a baseline signal, noise information and performance.

The contemplated use of the system of the present invention is for an aerial, remote sensor that will detect underwater sound through an ice layer preferably using a laser Doppler vibrometer with or without a glint tracking system and/or retro-reflective sensing aids. Without the tracker system, the LDV beam still needs to be steered onto the ice surface, but without the secondary illumination beam and camera system that identifies steering trajectories for surface glints spots.

The remote sensing capability can be used to measure iceberg or glacier tectonics, fracture, and growth as well as ice surface geometry fine structure. The LDV 12 can also be used as a distance sensor as well as a vibration measuring device in order to accomplish these goals. The LDV 12 can be deployed from a number of in-air platforms that may be stationary or moving such as airplanes, helicopters, and unmanned aerial vehicles, UAVs.

Alternative methods are to use this invention with an image-based glint tracking system in order to maintain optical and therefore acoustic signal return and/or retro-reflective sensing aids placed on the ice surface to increase the percentage of light that is reflected back to the LDV 12. The increased reflectivity will improve the signal-to-noise ratio within the laser interferometer, which improves the ability of the LDV to achieve the detection sensitivity measured under ideal conditions and outlined in the sensor's operational performance specification.

Once the LDV 12 has detected the sound on the ice surface at two or more locations, the controller can estimate the location of the underwater sound source. Information from the steering mirror trajectory will be needed along with an estimate of the sound speed in the water and the ice long with the ice thickness. The propagation path of the sound wave can then be estimated and an underwater location of the sound source can be determined. Multiple optical sensors 10 may also be employed for simultaneously acquiring information from several locations on the ice surface.

It will be understood that many additional changes in the details, materials, steps and arrangement of parts, which have been herein described and illustrated in order to explain the nature of the invention, may be made by those skilled in the art within the principle and scope of the expressed in the appended claims.

What is claimed is:

1. A system for detection of an underwater sound below an ice surface, said system comprising:
    a retro-reflective deposit positionable upon the ice surface;
    a laser Doppler vibrometer capable of producing an optical beam to the ice surface from a remote location wherein the optical beam is reflective off said retro-reflective deposit responsive of pressure from the underwater sound at the ice surface and wherein the reflected optical beam contains acoustic data detectable by said vibrometer such that said vibrometer is capable of translating a voltage output from the acoustic data; and
    a computer controller operationally connected to said vibrometer wherein said controller is capable of acquisition of the voltage output and processing of the voltage output to estimate a sound pressure level of the underwater sound.

2. A system for detection of an underwater sound below an ice surface, said system comprising:
    a plurality of laser Doppler vibrometers with each of said vibrometers capable of producing an optical beam to the ice surface from a remote location wherein the optical beam is reflective off the ice surface responsive of pressure from the underwater sound at the ice surface and wherein the reflected optical beam contains acoustic data detectable by said vibrometer such that said vibrometer is capable of translating a voltage output from the acoustic data; and
    a plurality of computer controllers, with each of said controllers operationally connected to a vibrometer of said vibrometers wherein each controller of said controllers is capable of acquisition of the voltage output and processing of the voltage output to estimate a sound pressure level of the underwater sound;

wherein simultaneous use of said plurality of vibrometers and accompanying controllers allows simultaneous acquisition of acoustic data from several locations on the ice surface.

* * * * *